(12) United States Patent
Wu et al.

(10) Patent No.: US 12,198,674 B2
(45) Date of Patent: Jan. 14, 2025

(54) SPEECH SYNTHESIS METHOD AND APPARATUS, AND STORAGE MEDIUM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Zhizheng Wu, Beijing (CN); Wei Song, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

(*) Notice: Subject to any disclaimer, the term of this patent is extended or adjusted under 35 U.S.C. 154(b) by 493 days.

(21) Appl. No.: 17/629,483

(22) PCT Filed: Mar. 18, 2020

(86) PCT No.: PCT/CN2020/079930
§ 371 (c)(1),
(2) Date: Jan. 24, 2022

(87) PCT Pub. No.: WO2021/051765
PCT Pub. Date: Mar. 25, 2021

(65) Prior Publication Data
US 2022/0270587 A1 Aug. 25, 2022

(30) Foreign Application Priority Data
Sep. 17, 2019 (CN) .......................... 201910878228.3

(51) Int. Cl.
*G10L 13/047* (2013.01)
*G10L 13/06* (2013.01)
*G10L 25/18* (2013.01)

(52) U.S. Cl.
CPC ............ *G10L 13/047* (2013.01); *G10L 13/06* (2013.01); *G10L 25/18* (2013.01)

(58) Field of Classification Search
None
See application file for complete search history.

(56) References Cited

U.S. PATENT DOCUMENTS 6,795,808 B1 * 9/2004 Strubbe ................ H04N 21/466
704/E15.04
11,922,924 B2 * 3/2024 Yang ...................... G10L 13/033
(Continued)

FOREIGN PATENT DOCUMENTS

CN 1945691 A 4/2007
CN 105261355 A 1/2016
(Continued)

OTHER PUBLICATIONS

Lee, et al. "Voice Imitating Text-to-Speech Neural Networks", arXiv:1806.00927v1, Jun. 4, 2018 (Year: 2018).*
(Continued)

*Primary Examiner* — Nicole A K Schmieder
(74) *Attorney, Agent, or Firm* — Cooper Legal Group, LLC

(57) ABSTRACT

Disclosed are a speech synthesis method and apparatus, and a storage medium. The method comprises: acquiring a symbol sequency of a statement to be synthesized, wherein the statement to be synthesized comprises a recorded statement characterizing a target object and a query result statement for the target object; encoding the symbol sequence by using a pre-set encoding model, in order to obtain a feature vector set; acquiring recording acoustic features corresponding to the recorded statement; predicting, according to a pre-set decoding model, the feature vector set, a pre-set attention model and the recording acoustic features, acoustic features corresponding to the statement to be synthesized, in (Continued)

order to obtain predicted acoustic features corresponding to the statement to be synthesized, wherein the pre-set attention model is a model that uses the feature vector set to generate a context vector used for decoding, and the predicted acoustic features are composed of at least one associated acoustic feature; and performing feature conversion and synthesis on the predicted acoustic features to obtain a speech corresponding to the sentence to be synthesized.

17 Claims, 5 Drawing Sheets

(56) References Cited

U.S. PATENT DOCUMENTS

| | | |
|---|---|---|
| 2016/0365087 A1 | 12/2016 | Freud |
| 2019/0065486 A1 | 2/2019 | Lin et al. |
| 2019/0122651 A1 | 4/2019 | Arik et al. |
| 2019/0180732 A1 | 6/2019 | Ping et al. |

FOREIGN PATENT DOCUMENTS

| | | |
|---|---|---|
| CN | 105355193 A | 2/2016 |
| CN | 107871494 A | 4/2018 |
| CN | 109036375 A | 12/2018 |
| CN | 109697974 A | 4/2019 |
| CN | 109767755 A | 5/2019 |
| CN | 109979429 A | 7/2019 |
| CN | 110033755 A | 7/2019 |
| EP | 1256932 A2 | 11/2002 |
| JP | 2003295880 A | 10/2003 |
| JP | 2006133559 A | 5/2006 |
| JP | 2008107454 A | 5/2008 |
| JP | 2019120841 A | 7/2019 |
| WO | 2019040173 A1 | 2/2019 |
| WO | 2019139430 A1 | 7/2019 |

OTHER PUBLICATIONS

"Hybrid Unit Selection Speech Synthesis System Target Cost Construction", 2018, Cai Wenbin, Wei Yunlong and Xu Haihua, «Computer Engineering and Application, 54(24), http://cea.ceaj.org/CN/10.3778/j. 6 pages with English translation.

"Tacotron: A Fully End-to-End Text-to-Speech Synthesis Model", Mar. 2017, Yuxuan Wang, RJ Skerry-Ryan, Daisy Stanton, Yonghui Wu, Ron J. Weiss, Navdeep Jaitly, Zonghengy Yang, Ying Xiao, Zhifent Chen, Samy Bengio, Quoc Le, Yannis Agiomyrgiannakis, Rob Clark and Rif A .Saurous, Cornell University, Computer Science, Computation and Language, 10 pgs.

"Application of Speech Synthesis Based on Tacotron Model", Dec. 2018, Source: Penguin—Deep Learning Daily Digest, reprinted from the Internet at: https://cloud.tencent.com/developer/news/376583, 8 pgs.

International Search Report in the international application No. PCT/CN2020/079930, mailed on Jun. 23, 2020, 3 pgs.

English translation of the Written Opinion of the International Search Authority in the international application No. PCT/CN2020/079930, mailed on Jun. 23, 2020, 5 pgs.

* cited by examiner

SPEECH SYNTHESIS METHOD AND APPARATUS, AND STORAGE MEDIUM

CROSS-REFERENCE TO RELATED APPLICATION

This application is filed based upon and claims priority to Chinese patent application No. 201910878228.3, filed on Sep. 17, 2019, the disclosure of which is hereby incorporated by reference in its entirety.

TECHNICAL FIELD

The embodiments of the present disclosure relate to the technology of speech processing in the field of electronic application, and in particular, to a speech synthesis method and apparatus, and a storage medium.

BACKGROUND

At present, a speech synthesis technology is applied to many intelligent devices, such as an intelligent sound box, a telephone outbound call system, and a queue management system. The intelligent device generates, after receiving a query request that is sent by a user for a target object, a statement to be synthesized that represents a target object and a query result according to the query request, converts the statement to be synthesized into a complete speech, and plays the complete speech, so as to inform the user of the query result about the target object. When the statement to be synthesized is converted into the complete speech, the recording of the target object is recorded in advance for the fixed target object in the statement to be synthesized. For the dynamically updated query request in the statement to be synthesized, synthesized speech corresponding to the query result is synthesized in a speech synthesizing manner, and the recording and the synthesized speech are spliced to obtain the complete speech of the statement to be synthesized.

However, since a process of generating the recording and a process of generating the synthesized speech are independent from each other, the speech speed, the tone, and the like of the recording are different from those of the synthesized speech, which will lead to the rhythm inconsistency of the complete speech obtained by combining the recording and synthesis speech, thereby resulting in uncertainty in the transition time period between the recording and the synthesized speech, and poor speech quality.

SUMMARY

A main objective of the present disclosure is to provide a speech synthesis method and apparatus, and a storage medium, which realizes the rhythm inconsistency of the synthesized speech and improves the quality of the synthesized speech.

The technical solution of the present disclosure is implemented as follows.

The embodiments of the present disclosure provide a speech synthesis method. The method may include the following operations.

A symbol sequence of a statement to be synthesized is acquired. The statement to be synthesized includes a recorded statement that represents a target object and a query result statement for the target object.

Encoding processing is performed on the symbol sequence to obtain a feature vector set by using a preset encoding model.

A recording acoustic feature corresponding to a recorded statement is acquired.

Prediction is performed on an acoustic feature corresponding to the statement to be synthesized based on a preset decoding model, the feature vector set, a preset attention model, and the recording acoustic feature to obtain predicted acoustic features corresponding to the statement to be synthesized. The preset attention model is a model for generating a context vector for decoding by using the feature vector set. The predicted acoustic feature consists of at least one related acoustic feature.

Feature conversion and synthesis is performed on the predicted acoustic feature to obtain the speech corresponding to the statement to be synthesized.

In the above solution, the operation that prediction may be performed on an acoustic feature corresponding to the statement to be synthesized based on a preset decoding model, the feature vector set, a preset attention model, and the recording acoustic feature to obtain predicted acoustic features corresponding to the statement to be synthesized includes the following operations.

When i is equal to 1, an initial acoustic feature is acquired at an ith decoding time. A 1st acoustic feature is predicted based on the initial acoustic feature, the preset decoding model, the feature vector set, and the preset attention model, and i is an integer greater than 0.

In a case where i is greater than 1, when the ith decoding time is a decoding time of the recorded statement, a jth frame of acoustic feature may be taken from the recording acoustic feature. The jth frame of acoustic feature may be taken as an (i−1)th frame of acoustic feature. The ith acoustic feature is predicted based on the (i−1)th frame of acoustic feature, the preset decoding model, the feature vector set, and the preset attention model, and j is an integer greater than 0.

When the ith decoding time is a decoding time of a query result statement, one frame of acoustic feature of the (i−1)th acoustic feature may be taken as the (i−1)th frame of acoustic feature. The ith acoustic feature may be predicted based on the (i−1)th frame of acoustic feature, the preset decoding model, the feature vector set, and the preset attention model.

A prediction process of the (i+1)th decoding time may be continued to be executed until the decoding of the statement to be synthesized is ended to obtain an nth acoustic feature. Herein, n is the total number of frames of the decoding times of the statement to be synthesized, and is an integer greater than 1.

The obtained ith acoustic feature to the nth acoustic feature are taken as the predicted acoustic features.

In the above solution, the preset decoding model includes a first Recurrent Neural Network (RNN) and a second RNN. The operation that the ith acoustic feature may be predicted based on the (i−1)th frame of acoustic feature, the preset decoding model, the feature vector set, and the preset attention model may include the following operations.

Nonlinear transformation may be performed on the (i−1)th frame of acoustic feature to obtain an intermediate feature vector.

Matrix operation and non-linear transformation may be performed on the intermediate feature vector to obtain an ith intermediate hidden variable by using the first RNN.

Context vector calculation may be performed on the feature vector set and the ith intermediate hidden variable to obtain an ith context vector by using the preset attention model.

Matrix operation and non-linear transformation may be performed on the ith context vector and the ith intermediate hidden variable to obtain an ith hidden variable by using the second RNN.

Linear transformation may be performed on the ith hidden variable to obtain an ith acoustic feature according to a preset number of frames.

In the above solution, the feature vector set includes a feature vector corresponding to each symbol in the symbol sequence. The operation that context vector calculation may be performed on the feature vector set and the ith intermediate hidden variable to obtain an ith context vector by using the preset attention model may include the following operations.

Attention calculation may be performed on the feature vector corresponding to each symbol in the symbol sequence and the ith intermediate hidden variable to obtain an ith group of attention values by using the preset attention model.

Weighted summation may be performed on the feature vector set to obtain the ith context vector according to the ith group of attention values.

In the above solution, after the ith acoustic feature is predicted based on the (i−1)th frame of acoustic feature, the preset decoding model, the feature vector set, and the preset attention model, and before the prediction process of the (i+1)th decoding time is continued to be executed until the decoding of the statement to be synthesized is ended, the method may further include the following operations.

An ith target symbol corresponding to a maximum attention value may be determined from the ith group of attention values.

When the ith target symbol is a non-terminal symbol of the recorded statement, an (i+1)th decoding time may be determined as a decoding time of the recorded statement.

Additionally or alternatively, when the ith target symbol is a non-terminal symbol of the query result statement, the (i+1)th decoding time may be determined as a decoding time of the query result statement.

Additionally or alternatively, when the ith target symbol is a non-terminal symbol of the recorded statement, and a terminal symbol of the recorded statement is not the terminal symbol of the statement to be synthesized, the (i+1)th decoding time may be determined as a decoding time of the query result statement.

Additionally or alternatively, when the ith target symbol is a terminal symbol of the query result statement, and the terminal symbol of the query result statement is not the terminal symbol of the statement to be synthesized, the (i+1)th decoding time may be determined as a decoding time of the recorded statement.

Additionally or alternatively, when the ith target symbol is a terminal symbol of the statement to be synthesized, the (i+1)th decoding time may be determined as a decoding time of the statement to be synthesized.

In the above solution, the operation that the encoding processing may be performed on the symbol sequence to obtain a feature vector set by using a preset encoding model may include the following operations.

Vector conversion may be performed on the symbol sequence to obtain an initial feature vector set by using the preset encoding model.

Nonlinear transformation and feature extraction are performed on the initial feature vector to obtain the feature vector set.

In the above solution, the operation that feature conversion and synthesis may be performed on the predicted acoustic feature to obtain the speech corresponding to the statement to be synthesized may include the following operations.

The feature conversion may be performed on the predicted acoustic feature to obtain a linear spectrum.

Reconstruction and synthesis may be performed on the linear spectrum to obtain the speech.

In the above solution, the symbol sequence is a letter sequence or a phoneme sequence.

In the above solution, before the symbol sequence of the statement to be synthesized is acquired, the method further includes the following operations.

A sample symbol sequence corresponding to at least one sample synthetic statement may be acquired, and each sample synthetic statement represents a sample object and a reference query result for the sample object.

An initial speech synthesis model, an initial acoustic feature, and the sample acoustic feature corresponding to the sample synthesis statement may be acquired. The initial speech synthesis model is a model configured for encoding processing and prediction.

The initial speech synthesis model may be trained by using the sample symbol sequence, the initial acoustic feature, and the sample acoustic feature to obtain the preset encoding model, the preset decoding model, and the preset attention model.

The embodiments of the present disclosure provide a speech synthesis apparatus. The apparatus may include: a sequence generation module, a speech synthesis module, and an acquisition module.

The sequence generation module may be configured to acquire a symbol sequence of a statement to be synthesized. The statement to be synthesized may include a recorded statement that represents the target object and a query result statement for the target object.

The speech synthesis module may be configured to perform encoding processing on the symbol sequence to obtain a feature vector set by using the preset encoding model.

The acquisition module may be configured to acquire a recording acoustic feature corresponding to the recorded statement.

The speech synthesis module may further be configured to: perform prediction on the acoustic feature corresponding to the statement to be synthesized based on the preset decoding model, the feature vector set, the preset attention model, and the recording acoustic feature to obtain predicted acoustic features corresponding to the statement to be synthesized, the preset attention model being a model for generating a context vector for decoding by using the feature vector set, and the predicted acoustic feature consisting of at least one related acoustic feature; and perform feature conversion and synthesis on the predicted acoustic feature to obtain the speech corresponding to the statement to be synthesized.

In the above solution, the speech synthesis module may be configured to perform the following operations. When i is equal to 1, an initial acoustic feature is acquired at an ith decoding time, and a 1st acoustic feature is predicted based on the initial acoustic feature, the preset decoding model, the feature vector set, and the preset attention model, and i is an integer greater than 0.

In a case where i is greater than 1, when the ith decoding time is a decoding time of the recorded statement, a jth frame of acoustic feature may be taken from the recording acoustic feature. The jth frame of acoustic feature is taken as an (i−1)th frame of acoustic feature. The ith acoustic feature is predicted based on the (i−1)th frame of acoustic feature, the preset decoding model, the feature vector set, and the preset attention model, and j is an integer greater than 0.

When the ith decoding time is a decoding time of the query result statement, one frame of acoustic feature of the (i−1)th acoustic feature is taken as the (i−1)th frame of acoustic feature. The ith acoustic feature is predicted based on the (i−1)th frame of acoustic feature, the preset decoding model, the feature vector set, and the preset attention model.

A prediction process of the (i+1)th decoding time is continued to be executed until the decoding of the statement to be synthesized is ended to obtain an nth acoustic feature. Herein, n is the total number of frames of the decoding times of the statement to be synthesized, and is an integer greater than 1.

The obtained ith acoustic feature to the nth acoustic feature are taken as the predicted acoustic features.

In the above solution, the preset decoding model includes a first RNN and a second RNN.

The speech synthesis module is configured to: perform non-linear transformation on the (i−1)th frame of acoustic feature to obtain an intermediate feature vector; perform matrix operation and non-linear transformation on the intermediate feature vector to obtain an ith intermediate hidden variable by using the first recurrent neural network; perform context vector calculation on the feature vector set and the ith intermediate hidden variable to obtain an ith context vector by using the preset attention model; perform matrix operation and non-linear transformation on the ith context vector and the ith intermediate hidden variable to obtain an ith hidden variable by using the second recurrent neural network; and perform linear transformation on the ith hidden variable to obtain an ith acoustic feature according to a preset number of frames.

In the above solution, the feature vector set includes a feature vector corresponding to each symbol in the symbol sequence.

The speech synthesis module is configured to perform context vector calculation on the feature vector corresponding to each symbol in the symbol sequence and the ith intermediate hidden variable to obtain an ith group of attention values by using the preset attention model; and perform weighted summation on the feature vector set to obtain the ith context vector according to the ith group of attention values.

In the above solution, the speech synthesis module is further configured to perform the following operations. After the ith acoustic feature is predicted based on the (i−1)th frame of acoustic feature, the preset decoding model, the feature vector set, and the preset attention model, and before the prediction process of the (i+1)th decoding time is continued to be executed until the decoding of the statement to be synthesized is ended, an ith target symbol corresponding to a maximum attention value is determined from the ith group of attention values.

When the ith target symbol is a non-terminal symbol of the recorded statement, an (i+1)th decoding time is determined as a decoding time of the recorded statement.

Additionally or alternatively, when the ith target symbol is a non-terminal symbol of the query result statement, the (i+1)th decoding time may be determined as a decoding time of the query result statement.

Additionally or alternatively, when the ith target symbol is a non-terminal symbol of the recorded statement, and a terminal symbol of the recorded statement is not the terminal symbol of the statement to be synthesized, the (i+1)th decoding time may be determined as a decoding time of the query result statement.

Additionally or alternatively, when the ith target symbol is a terminal symbol of the query result statement, and the terminal symbol of the query result statement is not the terminal symbol of the statement to be synthesized, the (i+1)th decoding time may be determined as a decoding time of the recorded statement.

Additionally or alternatively, when the ith target symbol is a terminal symbol of the statement to be synthesized, the (i+1)th decoding time may be determined as a decoding time of the statement to be synthesized.

In the above solution, the speech synthesis module is configured to perform vector conversion on the symbol sequence to obtain an initial feature vector set, and perform non-linear transformation and feature extraction on the initial feature vector to obtain the feature vector set.

In the above solution, the speech synthesis module is configured to perform feature conversion on the predicted acoustic feature to obtain a linear spectrum; and perform reconstruction and synthesis on the linear spectrum to obtain the speech.

In the above solution, the symbol sequence is a letter sequence or a phoneme sequence.

In the above solution, the apparatus further includes a training module.

The training module is configured to: acquire a sample symbol sequence corresponding to each of at least one sample synthesis statement before acquiring the symbol sequence of the statement to be synthesized, herein, each sample synthesis statement represents a sample object and a reference query result for the sample object; acquire an initial speech synthesis model, an initial acoustic feature, and the sample acoustic feature corresponding to the sample synthesis statement, herein, the initial speech synthesis model is a model configured for encoding processing and prediction; and train the initial speech synthesis model by using the sample symbol sequence, the initial acoustic feature, and the sample acoustic feature to obtain the preset encoding model, the preset decoding model, and the preset attention model.

The embodiments of the present disclosure provide a speech synthesis apparatus. The apparatus includes a processor, a memory, and a communication bus. The memory is configured to communicate with the processor through the communication bus. The memory is configured to store one or more programs executable by the processor. When one or more programs are executed, steps of any one of the previously described speech synthesis methods are executed by the processor.

The embodiments of the present disclosure provide a computer-readable storage medium, in which a program is stored. When the computer is executed by at least one processor, the at least one processor executes the steps of any one of the previously described speech synthesis methods.

The embodiments of the present disclosure provide a speech synthesis method and apparatus, and a storage medium. By adopting the above technical implementation solution, the predicted acoustic feature corresponding to the statement to be synthesized is predicted based on the preset decoding model, the feature vector set, the preset attention model, and the recording acoustic feature. Since the statement to be synthesized includes the recorded statement and the query result statement, that is to say, the predicted acoustic features corresponding to the recorded statement and the query result statement are predicted, and the predicted acoustic features consist of associated a plurality of acoustic features, the problems that the speech speed, the tone, and the like of the recording and the synthesized speech are different are solved, thus, the speech rhythm obtained by the predicted acoustic feature is consistent. Secondarily, feature conversion and synthesis are performed on the predicted acoustic feature corresponding to the statement to be synthesized, which avoids the problem of uncertainty in the excessive duration during recording splicing and speech synthesizing, and improves the quality of the synthesized speech.

DETAILED DESCRIPTION

The technical solutions in the embodiments of the present disclosure will be clearly and completely described hereinbelow with reference to drawings in the embodiments of the present disclosure.

In subsequent description, suffixes such as "module", "component" or "unit" used to represent elements are used only to facilitate the description of the present disclosure, which has no specific meaning in it. Therefore, the "module", "component" or "unit" may be mixed for use.

Figure 1:
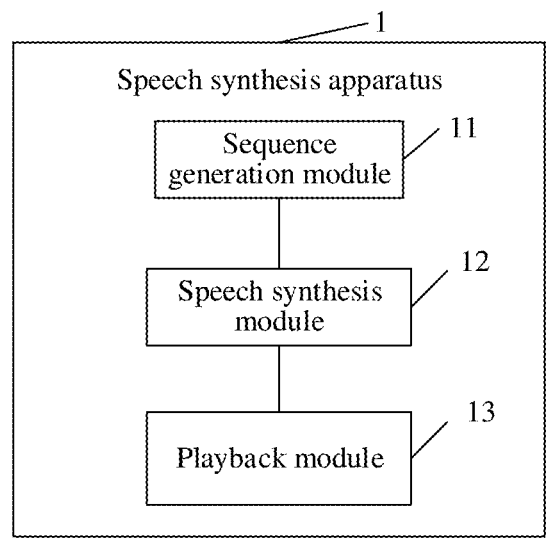
FIG. 1 is a structural schematic diagram 1 of a speech synthesis apparatus provided by embodiments of the present disclosure.

Referring to FIG. 1 below, it is a schematic diagram of a speech synthesis apparatus 1 for implementing various embodiments of the present disclosure. The apparatus 1 includes: a sequence generation module 11, a speech synthesis module 12, and a playback module 13. The sequence generation module 11 receives a query request that is sent by a user for a target object, and determines a statement to be synthesized according to the query request, the statement to be synthesized being a text about a query result of the target object, and transmits a symbol sequence of the statement to be synthesized to the speech synthesis module 12. The speech synthesis module 12 performs speech synthesis on the symbol sequence to obtain the speech corresponding to the speech to be synthesized, and transmits the speech to the playback module 13. The playback module 13 plays the speech.

Figure 2:
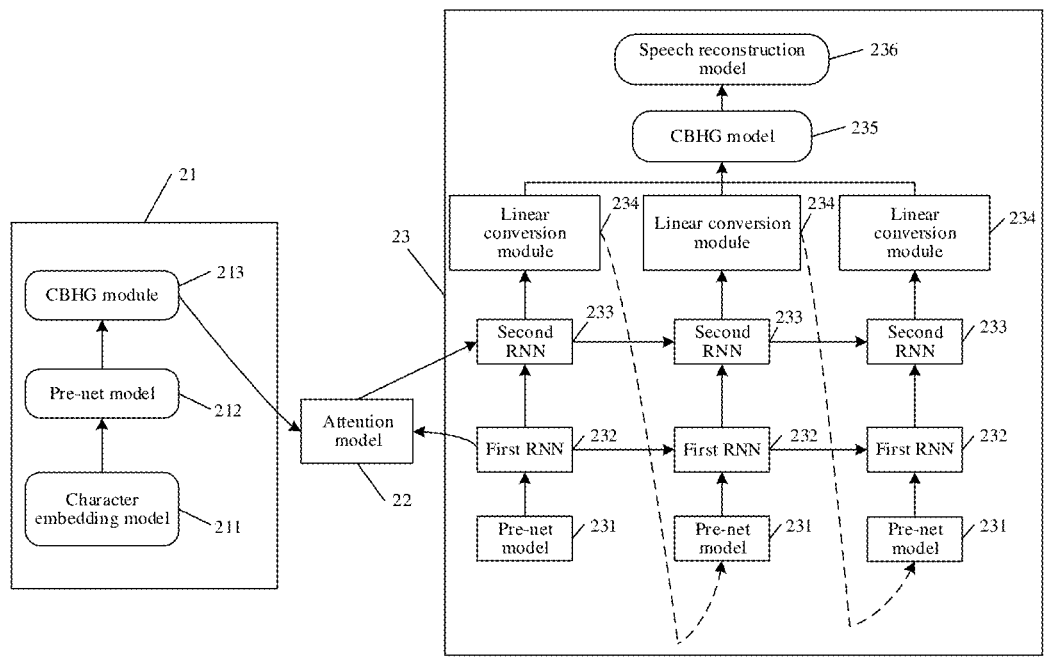
FIG. 2 is a structural schematic diagram of a Tacotron model provided by the embodiments of the present disclosure.

In some embodiments, the speech synthesis module 12 is a module built by an attention module and an Encoder-Decoder model, for example, the speech synthesis module 12 is a Tacotron model. The Tacotron model is a deep learning-based Text to speech (TTS) model. As shown in FIG. 2, the Tacotron model mainly includes a encoding model 21, an attention model 22, and a decoding module 23. The encoding model 21 includes a character embedding model 211, a Pre-net model 212, and a CBHG model 213. The decoding module 23 includes a Pre-net model 231, a first RNN 232, a second RNN 233, a linear transformation model 234, a CBHG model 235, and a speech reconstruction model 236. The structures of the CBHG model 213 and the CBHG model 235 are the same, which both consist of a convolution bank, a highway network, and a Gated Recurrent Unit (GRU). The speech reconstruction model 236 includes a model generated by adopting a Griffin-Lim algorithm.

Illustratively, the Tacotron model receives a symbol sequence of a statement to be synthesized, and starts to execute an encoding process as follows: the character embedding model 211 performs vector conversion on the symbol sequence to obtain a converted vector set, and transmits the converted vector set to the Pre-net model 212. The Pre-net model 212 performs non-linear transformation on the converted vector set to obtain an intermediate feature vector set, and transmits the intermediate feature vector set to the CBHG model 213. The CBHG model 213 performs a series of matrix operations and non-linear transformations on the intermediate feature vector set to obtain a feature vector set. Thus, the encoding is ended.

Further, after the encoding process is ended, a prediction process is started to be executed as follows: at a current number of decoding times, the Pre-net model 231 performs non-linear transformation on a current frame of acoustic feature to obtain an intermediate feature vector, and transmits the intermediate feature vector to the first RNN 232. The first RNN 232 performs a series of matrix operation and non-linear transformation on the intermediate feature vector to obtain a current number of intermediate hidden variables (hidden states), and transmits the current number of intermediate hidden variables to the attention model 22 and the second RNN 233. The first RNN 232 also stores the current number of intermediate hidden variables, and is used in a next frame of interface time. The attention model 22 perform context vector calculation on the feature vector obtained by the current number of intermediate hidden variables and the feature vector set obtained by encoding to obtain the current number of context vectors, and transmits the current number of context vectors to the second RNN 233. The second RNN performs a series of matrix operations and non-linear transformations on the current context vector and the current number of intermediate hidden states to obtain a current number of hidden variables, and transmits the current number of hidden variables to the linear transformation model 234. The linear transformation model 234 performs linear transformation on the current number of hidden variables to obtain the current number of acoustic features, and transmits the current number of acoustic features to the CBHG model 235. A prediction process of the next decoding time is continued to be executed. The CBHG model 235 performs feature conversion on a 1st acoustic feature to a last acoustic feature to obtain a linear spectrum. The linear spectrum is transmitted to the speech reconstruction model 236. The speech reconstruction model 236 performs reconstruction and synthesis on the linear spectrum to generate speech.

It is to be noted that dotted lines in FIG. 2 indicates that the decoding model 23 may execute the prediction process in an autoregressive manner in the prediction process, that is, one frame of acoustic feature in the current number of acoustic features obtained at the current number of decoding times is taken as an input of the next decoding time, or may execute the prediction process without using the autoregressive manner, that is, the input of the next decoding time is not one frame of acoustic feature in the current number of acoustic features obtained at the current number of decoding times. In FIG. 2, description is made by only taking the decoding times as an example, and the decoding times are not limited in the embodiments of the present disclosure.

Those skilled in the art may understand that the structures of the speech synthesis apparatus shown in FIG. 1 and FIG. 2 do not constitute a limitation to the speech synthesis apparatus. The speech synthesis apparatus may include parts more or fewer than those shown in the figures, or combine some parts, or have different part arrangements.

It is to be understood that the embodiments of the present disclosure may be implemented based on the speech synthesis apparatus as shown in FIG. 1 and FIG. 2. Specific embodiments of speech synthesis are described based on FIG. 1 and FIG. 2.

First Embodiment

Figure 3:
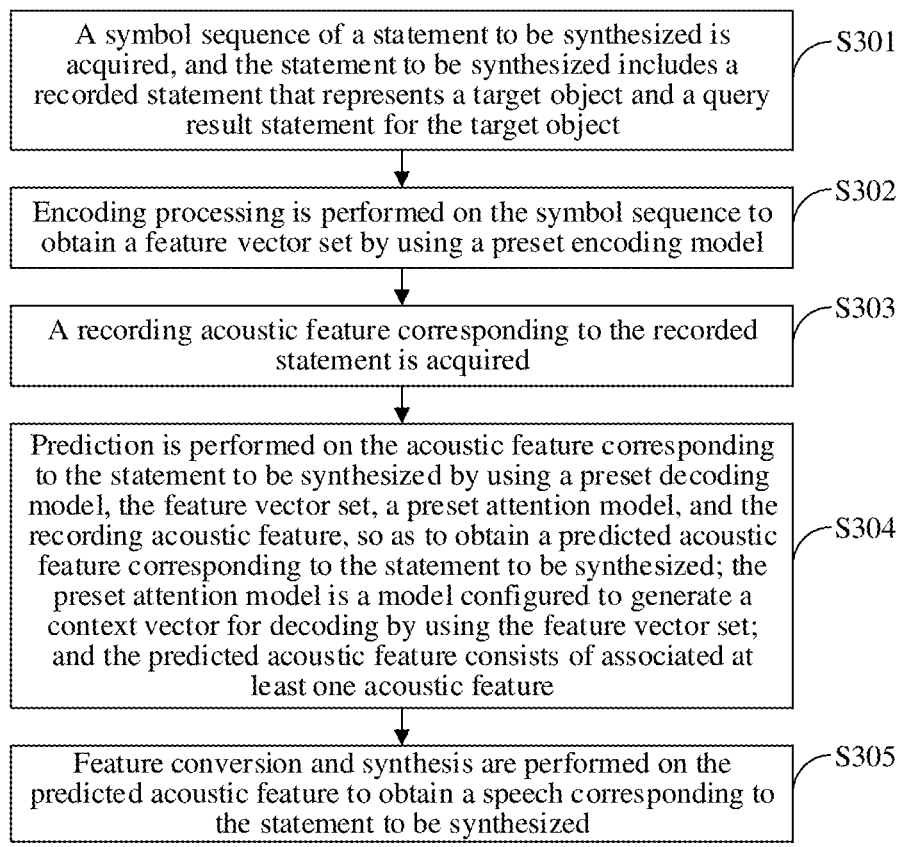
FIG. 3 is a first flowchart of a speech synthesis method provided by the embodiments of the present disclosure.

The embodiment of the present disclosure provides a speech synthesis method. As shown in FIG. 3, the method includes the following operations.

At S301, a symbol sequence of a statement to be synthesized is acquired. The statement to be synthesized includes a recorded statement that represents a target object and a query result statement for the target object.

The speech synthesis apparatus generates, when receiving a query request for the target object, a statement to be synthesized according to the query request, and acquires a symbol sequence of the statement to be synthesized. The symbol sequence is a letter sequence or a phoneme sequence.

In some embodiments, the speech synthesis apparatus acquires query result information in the following mode: acquiring the query result information from the query result, acquiring the query result information from a storage module according to the query request, and acquiring the query result information by requesting to an external device; collating a text in the query result information to obtain a query result statement; in addition, acquiring a recorded statement matched with the target object from a preset recorded statement library; and splicing the query result statement and the recorded statement to obtain a statement to be synthesized according to a verbal trick mode, and then generating a symbol sequence of the statement to be synthesized.

In some embodiments, the preset recorded statement library stores recordings, recorded statements, and recording Mel spectra in one to one correspondence. Before S301, the speech synthesis apparatus extracts out at least one frame of Mel spectrum for each recording in advance, and stores the recording, the recorded statement, and the at least one frame of Mel spectrum in the preset recorded statement library, and the duration of one frame may be 10 ms or 15 ms.

In some embodiments, the verbal trick mode is mainly divided into three types: first, the query result statement is located at an intermediate position of the recorded statement, for example, respected Mr. X, "X" is a query result statement; second, the query result statement is located at an end of the recorded statement, for example, the weather in Beijing today is sunny to cloudy, "sunny to cloudy" is a query result statement; and third, the query result statement is located at a beginning of the recorded statement, for example, an XX song, ""XX" is a query result statement.

In some embodiments, the recorded statement in the statement to be synthesized is divided into a first sub-recorded statement and a second sub-recorded statement. The first sub-recorded statement is located in front of the second sub-recorded statement.

Illustratively, taking the speech synthesis apparatus being an intelligent sound box as an example, a user sends a query result about what weather is in Beijing today, the intelligent sound box sends a request about what weather is in Beijing today to a whether query device, receives the query result information including sunny to cloudy returned by the weather query device, and takes the sunny to cloudy as a query result statement. The intelligent sound box also acquires a recorded statement about the weather in Beijing from the preset recorded statement library, and splices to obtain a statement to be synthesized as that the weather in Beijing today is sunny to cloudy.

In some embodiments, a phoneme sequence of the statement to be synthesized is generated according to a pronunciation order of the statement to be synthesized; or a letter sequence of the statement to be synthesized is generated according to an alphabetic spelling order of the statement to be synthesized.

Illustratively, when the statement to be synthesized is HelloEverybody, the corresponding letter sequence is {h, e, l, l, o, e, v, e, r, y, b, o, d, y}.

At S302, encoding processing is performed on the symbol sequence to obtain a feature vector set by using a preset encoding model.

An encoding model in the speech synthesis apparatus performs encoding processing on the symbol sequence to obtain a feature vector set. The feature vector set consists of feature vectors of all symbols in the symbol sequence. The encoding model is the preset encoding model.

In some embodiments, the speech synthesis apparatus performs vector conversion on the symbol sequence to obtain an initial feature vector set, and performs non-linear transformation and feature extraction on the initial feature vector to obtain a feature vector set.

The speech synthesis apparatus converts each symbol in the symbol sequence into a vector to obtain the initial feature vector set, and obtains the feature vector set.

At S303, a recording acoustic feature corresponding to the recorded statement is acquired.

The speech synthesis apparatus acquires the recording acoustic feature corresponding to the recorded statement from the preset recorded statement library, and acquires the recording acoustic feature corresponding to the recorded statement. The recording acoustic feature is at least one frame of Mel spectrum corresponding to the recorded statement.

In some embodiments, the recording acoustic feature represents a plurality of frames of acoustic features sorted according to the symbol sequence of the recorded statement.

At S304, prediction is performed on the acoustic feature corresponding to the statement to be synthesized based on a preset decoding model, the feature vector set, a preset attention model, and the recording acoustic feature to obtain predicted acoustic features corresponding to the statement to be synthesized. The preset attention model is a model for generating a context vector for decoding by using the feature vector set. The predicted acoustic feature consists of at least one related acoustic feature.

The speech synthesis apparatus predicts the acoustic feature corresponding to the statement to be synthesized to obtain the predicted acoustic feature through the preset decoding model and the preset attention model. In a prediction process, the preset decoding model may also extract one frame of acoustic feature from the recording acoustic feature, and takes the frame of acoustic feature as an input of the prediction process. The preset decoding model is a decoding model, and the preset attention model is an attention model.

In some embodiments, the speech synthesis apparatus is configured to: when i is equal to 1, acquire an initial acoustic feature at an ith decoding time, predict a 1st acoustic feature based on the initial acoustic feature, the preset decoding model, the feature vector set, and the preset attention model, and i being an integer greater than 0; in a case where i is greater than 1, and when the ith decoding time is a decoding time of the recorded statement, extract a jth frame of acoustic feature from the recording acoustic feature, take the jth frame of acoustic feature as an (i−1)th frame of acoustic feature, and predict the ith acoustic feature based on the (i−1)th frame of acoustic feature, the preset decoding model, the feature vector set, and the preset attention model, and j being an integer greater than 0; when the ith decoding time is a decoding time of a query result statement, take one frame of acoustic feature of the (i−1)th acoustic feature as the (i−1)th frame of acoustic feature, and predict the ith acoustic feature based on the (i−1)th frame of acoustic feature, the preset decoding model, the feature vector set, and the preset attention model; and continue to execute a prediction process of the (i+1)th decoding time until the decoding of the statement to be synthesized is ended to obtain an nth acoustic feature, n being the total number of frames of the decoding times of the statement to be synthesized, and being an integer greater than 1; and take the obtained ith acoustic feature to the nth acoustic feature as the predicted acoustic features.

The speech synthesis apparatus is configured to: take i as 1, and acquire an initial acoustic feature from the preset recorded statement library at a first decoding time, the initial acoustic feature being one frame of acoustic feature; take the initial acoustic feature and the feature vector set as an input, and predict the 1st acoustic feature by using the preset decoding model and the preset attention model; then, take i as 2, firstly judge the type of a second decoding time from the second decoding time, the type including a decoding time of the recorded statement, a decoding time of the query result statement, and a decoding end time of the statement to be synthesized; extract out the first frame of acoustic feature according to the type of the second decoding time, and take the first frame of acoustic feature as an input, and predict a second acoustic feature by using the preset decoding model, the feature vector set, and the preset attention model; and continue to judge the type of a third decoding time until the decoding of the statement to the synthesized is ended.

In some embodiments, the speech synthesis apparatus may set an all-zero vector with the size of one frame as the initial acoustic feature.

It is to be noted that considering that the recorded statement has the recording acoustic feature extracted from a real person recording, when the decoding time of the recorded statement is determined by judging the type of the ith decoding time, one frame of acoustic features may be taken out from the recording acoustic feature to predict the ith acoustic feature. Because it is predicted by using one frame of acoustic feature in the real person recording, the sound quality corresponding to the ith acoustic feature is more real.

In some embodiments, each acoustic feature from the ith acoustic feature to the nth acoustic feature includes one frame of acoustic feature or at least two frames of acoustic features. The number of frames of the acoustic features corresponding to the ith acoustic feature may be set. The at least two frames of acoustic features are a plurality of non-overlapping and time-continuous acoustic features, thus, a plurality of frames of acoustic features are predicted at each decoding time, which can reduce the decoding duration and the reduce the complexity of the decoding model.

In some embodiments, the last frame of acoustic feature in the (i−1)th frame of acoustic feature may be taken as the (i−1)th frame of acoustic feature. Correspondingly, the ith acoustic feature includes k frame of acoustic feature, the value of k is k*(i−1), k is the total number of frames corresponding to each acoustic feature, and k is a positive integer greater than 0.

Illustratively, when k=3, the value of j is 3, 6, 9, . . . .

In some embodiments, the speech synthesis apparatus takes the (k*i)th frame of acoustic feature from the recording acoustic feature in the prediction process of the ith decoding time, takes the (k*i)th frame of acoustic feature as the (i−1)th frame of acoustic feature, and takes the (k*i)th frame of acoustic feature as the (i−1)th frame of acoustic feature. In the prediction process of the (i+1)th decoding time, a k*(i+1)th frame of acoustic feature is taken out from the recording acoustic feature, and the k*(i+1)th frame of acoustic feature is taken as the ith frame of acoustic feature. The acoustic features of the (k*i)th frame of acoustic feature and the k*(i+1)th frame of acoustic feature are taken out according an order in accordance with the symbol sequence of the recorded statement.

In some embodiments, the preset decoding model includes a first RNN and a second RNN. The speech synthesis apparatus performs non-linear transformation on the (i−1)th frame of acoustic feature to obtain an intermediate feature vecto, performs matrix operation and non-linear transformation on the intermediate feature vector to obtain an ith intermediate hidden variable by using the first RNN, performs context vector calculation on the feature vector set and the ith intermediate hidden variable to obtain an ith context vector by using the preset attention model, performs matrix operation and non-linear transformation on the ith context vector and the ith intermediate hidden variable to obtain an ith hidden variable by using the second RNN, and performs linear transformation on the ith hidden variable to obtain an ith acoustic feature according to a preset number of frames.

The speech synthesis apparatus transmits the (i−1)th frame of acoustic feature to the preset decoding model at the ith decoding time, and the preset decoding model predicts the ith acoustic feature by using the (i−1)th frame of acoustic feature.

In some embodiments, the speech synthesis apparatus transmits the (i−1)th frame of acoustic feature into a Pre-net model in the decoding model at the ith decoding time. The Pre-net model performs non-linear transformation on the (i−1)th frame of acoustic feature to obtain an intermediate feature vector, and transmits the intermediate feature vector into the first RNN. The first RNN performs matrix operation and non-linear transformation on the intermediate feature vector to obtain an ith intermediate hidden variable, and transmits the intermediate hidden variable to the attention model and the second RNN. The attention model performs context vector calculation on the feature vector set and the ith intermediate hidden variable to obtain an ith context vector, and transmits the ith context vector to the second RNN. The second RNN performs matrix operation and non-linear transformation on the ith context vector and the ith intermediate feature vector to obtain an ith hidden variable, and transmits the ith hidden variable to a linear transformation module. The linear transformation module performs linear transformation on the ith hidden variable to obtain an ith acoustic feature according to a preset number of frames.

It is to be noted that the speech synthesis apparatus acquires the ith acoustic feature by using the first RNN and the second RNN in a prediction process. Since the RNN is an artificial neural network formed by connecting nodes into a ring directionally, the input of a current time sequence is processed by using the hidden variable that has been calculated so far, so that the output at one sequence position is associated with the input of all previous sequences. Thus, all acoustic features in the obtained predicted acoustic features are interrelated by using the first RNN and the second RNN, and then, the speech transition obtained by predicting the acoustic feature is more natural.

In some embodiments, the first RNN may be replaced with a first Long Short Term Memory Network (LSTM). Correspondingly, the second RNN may be replaced with a second LSTM. In addition, the first RNN and the second RNN may also be replaced with other neural networks, which is not limited in the embodiment of the present disclosure.

In some embodiments, the feature vector set includes feature vectors corresponding to all symbols in the symbol sequence. The speech synthesis apparatus performs attention calculation on the feature vectors corresponding to all symbols (letters or phonemes) in the symbol sequence and the ith intermediate hidden variable to obtain an ith group of attention values by using the preset attention model, and performs weighted summation on feature vector set to obtain the ith context according to the ith group of attention values.

The speech synthesis apparatus transmits the ith intermediate hidden variable to the attention model. The attention model calculates an attention value (similarity) between the feature vector corresponding to each symbol in the symbol sequence and the ith intermediate hidden variable, and correspondingly stores each symbol and the attention value to obtain an ith group of attention values, and the value range of the attention value is 0 to 1. The attention value corresponding to each symbol is taken as a weight of the feature vector corresponding to each symbol, and weighted summation is performed on all feature vectors in the feature vector set to obtain the ith context vector.

It is to be noted that an ith intermediate hidden variable is generated based on the (i−1)th frame of acoustic feature at an ith decoding time, and the ith intermediate hidden variable indicates a symbol that needs to be predicted at the ith decoding time. The attention model calculates the attention value between the feature vector corresponding to each symbol in the symbol sequence and the ith intermediate hidden variable, and the magnitude of the attention value indicates the correlation degree between the feature vector corresponding to each symbol and the symbol that needs to be predicted. Since the symbol that needs to be predicted at the ith decoding time include not only a main pronunciation symbol, but also a secondary pronunciation symbol closely connected with the main pronunciation symbol in pronunciation, attention values corresponding to a plurality of symbols in the symbol sequence are non-zero, and the symbol with the maximum attention value is a main pronunciation symbol.

In some embodiments, the speech synthesis apparatus determines an ith target symbol corresponding to the maximum attention value from the ith group of attention values after predicting the ith acoustic feature based on the (i−1)th frame of acoustic feature, the preset decoding model, the feature vector set, and the preset attention model and before continuing to perform the prediction process at an (i+1)th decoding time. when the ith target symbol is a non-terminal symbol of the recorded statement, an (i+1)th decoding time is determined as a decoding time of the recorded statement; and/or, when the ith target symbol is a non-terminal symbol of the query result statement, the (i+1)th decoding time is determined as a decoding time of the query result statement; and/or, when the ith target symbol is a non-terminal symbol of the recorded statement, and a terminal symbol of the recorded statement is not the terminal symbol of the statement to be synthesized, the (i+1)th decoding time is determined as a decoding time of the query result statement; and/or, when the ith target symbol is a terminal symbol of the query result statement, and the terminal symbol of the query result statement is not the terminal symbol of the statement to be synthesized, the (i+1)th decoding time is determined as a decoding time of the recorded statement; and/or, when the ith target symbol is a terminal symbol of the statement to be synthesized, the (i+1)th decoding time is determined as a decoding time of the statement to be synthesized.

The speech synthesis apparatus determines a special symbol from the symbol sequence when the symbol sequence of the statement to be synthesized is generated before judging the type of the ith target symbol. The special symbol includes at least one of the following items: a non-terminal symbol of a recorded statement, a terminal symbol of the recorded statement, a non-terminal symbol of a query result statement, a terminal symbol of the query result statement, and a terminal symbol of the statement to be synthesized. The symbol corresponding to the maximum attention value of the ith group of attention values is taken as the ith target symbol, and the ith target symbol is a main pronunciation symbol at the ith decoding time. The ith target symbol is compared with the special symbol in turn, until the type of the ith target symbol is determined.

It is to be noted that the speech synthesis apparatus takes i as 2, and judges the type of the ith decoding time by using the (i−1)th target symbol in the same way of judging the type of the (i+1)th decoding time before the ith acoustic feature is predicted based on the (i−1)th frame of acoustic feature, the preset decoding model, the feature vector set, and the preset attention model.

In some embodiments, the speech synthesis apparatus determines a start symbol and a terminal symbol of the recorded statement, a start symbol and a terminal symbol of the query result statement, and a terminal symbol of the statement to be synthesized from the symbol sequence when generating the symbol sequence of the statement to be synthesized before judging the type of the ith decoding time. The start symbol and the terminal symbol of the query result statement are in one-to-one correspondence. The start symbol and the terminal symbol of the query result statement are in one-to-one correspondence. The start symbol of the recorded statement or the start symbol of the query result state is a start symbol of the statement to be synthesized. The start symbol of the recorded statement or the start symbol of the query result statement is the start symbol of the statement to be synthesized, and the terminal symbol of the recorded statement or the terminal symbol of the query result statement is the terminal symbol of the statement to be synthesized.

Further, the speech synthesis apparatus takes the symbol corresponding to the maximum attention value in the ith group of attention values as an ith target symbol; compares the ith target symbol with the start symbol of the recorded statement, the start symbol of the statement to be synthesized, and the start symbol of the query result statement in turn; determines the (i+1)th decoding time as the decoding time of the recorded statement when the ith target symbol is the same as that start symbol of the recorded statement, and compares the (i+1)th target symbol and the terminal symbol of the recorded statement and the terminal symbol of the statement to be synthesized in turn in the prediction process of the (i+1)th decoding time; determines the (i+1)th target symbol as a non-terminal symbol of the recorded statement when the (i+1)th target symbol is different from the terminal symbol of the recorded statement and the terminal symbol of the statement to be synthesized, and then determines the (i+2)th decoding time as the decoding time of the statement to be synthesized; determines (i+1)th decoding time as the decoding time of the statement to be synthesized when the ith target symbol is the same as the start symbol of the query result statement, and compares the (i+1)th target symbol with the terminal symbol of the query result statement and the terminal symbol of the statement to be synthesized in turn in the prediction process of the (i+1)th decoding time; and determines the (i+1)th target symbol as a non-terminal symbol of the query result statement when the (i+1)th target symbol is different from the terminal symbol of the query result statement and the terminal symbol of the statement to be synthesized, and then determines the (i+2)th decoding time as the decoding time of the recorded statement.

In some embodiments, the speech synthesis apparatus adds one frame of decoding duration to the holding duration of the terminal symbol of the recorded statement, and judges whether the holding duration of the ith target symbol is less than a pre-set duration when determining that the ith target symbol is the terminal symbol of the recorded statement and is not the terminal symbol of the statement to be synthesized; determines the (i+1)th decoding time as the decoding time of the query result statement when the holding duration of the ith target symbol is greater than or equal to the pre-set duration, determines the (i+1)th decoding time as the decoding time of the recorded statement when the holding duration of the ith target symbol is less than the pre-set duration, continues to judge the (i+1)th target symbol, and determines the (m+1)th decoding time is the decoding time of the query result statement until the holding duration of the terminal symbol of the recorded statement is determined to be greater than or equal to the preset duration at an mth decoding time, herein, m is the total number of frames at the decoding time of the recorded statement and is an integer greater than 1. The preset duration is generally set to one frame of decoding duration or two frames of decoding duration, which is not limited in the embodiments of the present disclosure.

In some embodiments, the speech synthesis apparatus adds one frame of decoding duration to the holding duration of the terminal symbol of the query result statement, and judges whether the holding duration of the ith target symbol is less than a pre-set duration when determining that the ith target symbol is the terminal symbol of the query result statement and is not the terminal symbol of the statement to be synthesized; determines the (i+1)th decoding time as the decoding time of the recorded statement when the holding duration of the ith target symbol is greater than or equal to the pre-set duration, determines the (i+1)th decoding time as the decoding time of the query result when the holding duration of the ith target symbol is less than the pre-set duration, continues to judge the (i+1)th target symbol, and determines the (h+1)th decoding time is the decoding time of the query result statement until the holding duration of the terminal symbol of the query result statement is determined to be greater than or equal to the preset duration at an hth decoding time, herein, h is the total number of frames at the decoding time of the query result statement and is an integer greater than 1.

It is to be noted that the speech synthesis apparatus determines the type of the next decoding time by determining a target symbol at a current number of decoding times and comparing the target symbol with a feature symbol in turn. Thus, the type of each decoding time may be acquired without performing operations, such as special marking or symbol aligning, on the recorded statement or the query result statement in the statement to be synthesized. Further, the decoding of another statement is started when the holding duration is greater than or equal to a preset time length by judging the holding duration of the terminal symbol of one statement, so that the terminal symbol of the one statement can be pronounced completely.

In some embodiments, for the case where the recorded statement in the statement to be synthesized is located in front of the query result statement, it is found that the terminal symbol of the recorded statement is delayed in the obtained predicted acoustic features, which may be caused by too close connection between the prediction process of recorded statement and the prediction process of the query result statement. Therefore, the symbol preceding the terminal symbol in the recorded statement is set as an end statement of the recorded statement, so that the problem that the terminal symbol of the recorded statement is delayed is solved, and the transition between the speech of the recorded statement in the obtained speech and the speech of the query result statement is more fluent.

At S305, feature conversion and synthesis are performed on the predicted acoustic feature to obtain a speech corresponding to the statement to be synthesized.

The speech synthesis apparatus performs feature conversion on each acoustic feature in the predicted acoustic feature to obtain a linear spectrum, performs reconstruction and synthesis on the obtained all linear spectrum to obtain a speech corresponding to the statement to be synthesized, and transmits the speech to a playback module. The speech is played by the playback module, so that the user obtains the query result of the target object by listening to the speech.

In the above solution, the speech synthesis apparatus performs feature conversion on the predicted acoustic features to obtain a linear spectrum, and perform reconstruction and synthesis on the linear spectrum to obtain the speech.

The speech synthesis apparatus may perform reconstruction and synthesis on a linear spectrum to obtain a speech by using a Griffin-Lim algorithm.

It is to be noted that the recorded statement is predicted by using the recording acoustic features extracted from a real person recording, so that the sound quality of the speech corresponding to the recorded statement in the obtained speech is better after the feature conversion and synthesis are performed on the predicted acoustic features.

In some embodiments, before S301, the speech synthesis method further includes the following operations.

At S3001, a sample symbol sequence corresponding to each of at least one sample synthesis statement is acquired. Each sample synthesis statement represents a sample object and a reference query result for the sample object.

The speech synthesis apparatus generates a sample symbol sequence for each sample synthesis statement in at least one sample synthesis statement, and then obtains at least one sample symbol sequence. Sample objects in at least one sample symbol sequence includes a target object, and at least one sample synthesis statement may also include a query result statement.

At S3002, an initial speech synthesis model, an initial acoustic feature, and a sample acoustic feature corresponding to the sample synthesis statement are acquired. The initial speech synthesis model is a model configured for encoding processing and prediction.

The speech synthesis apparatus acquires the initial speech synthesis model, the initial acoustic feature, and the sample acoustic feature corresponding to each sample synthesis statement. The sample acoustic feature corresponding to each sample synthesis statement is acquired from the recording of each sample synthesis statement.

At S3003, the initial speech synthesis model is trained by using the sample symbol sequence, the initial acoustic feature, and the sample acoustic feature to obtain a preset encoding model, a preset decoding model, and a preset attention model.

The speech synthesis apparatus takes the sample symbol sequence as an input of a preset speech synthesis model. The preset speech synthesis model performs encoding processing on the sample symbol sequence to obtain a sample feature vector set; and then preset speech synthesis model predict a reference acoustic feature based on the sample feature vector set and the initial acoustic feature taking the initial acoustic feature as the input of the preset speech synthesis model. Calculation is performed on the reference acoustic feature and the sample acoustic feature by using a preset loss function to obtain an error value. When the error value is greater than a preset error threshold value, prediction is continued to be performed based on the sample feature vector set and the initial decoding model until the error value is less than or equal to the preset error threshold value.

In some embodiments, a preset error loss includes an absolute loss function (L1 Loss).

It is not be noted that the preset speech synthesis model predicts a process of the reference acoustic feature based on the sample feature vector set and the initial acoustic feature, which is in the same way of taking the (i−1)th frame of acoustic feature and the feature vector set as an input and predicting the process of the ith acoustic feature by using the preset decoding model and the preset attention model, and will not be elaborated herein.

Figure 4:
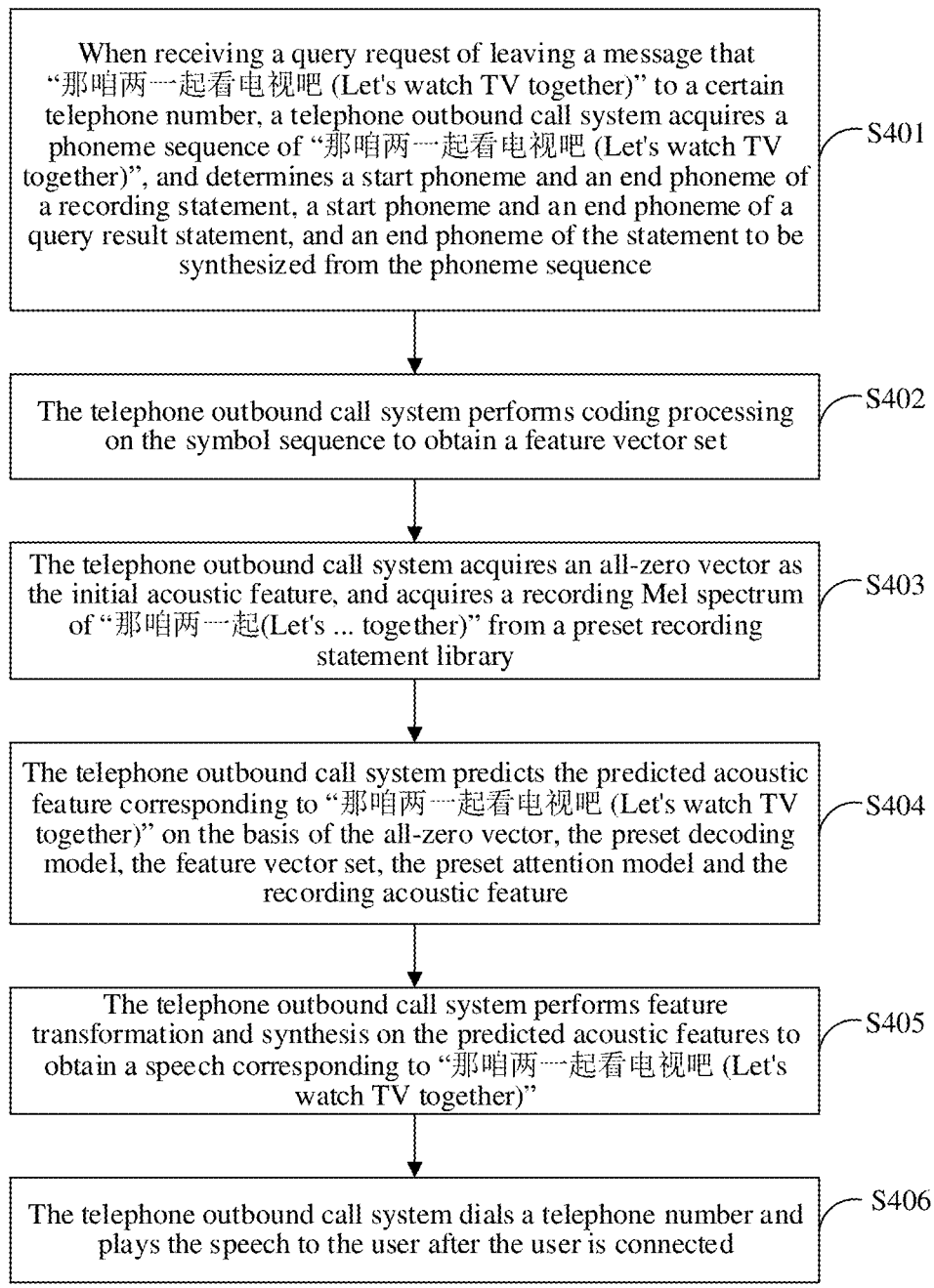
FIG. 4 is a second flowchart of a speech synthesis method provided by the embodiments of the present disclosure.

In some embodiments, taking a telephone outbound call system as an example, a speech synthesis method as shown in FIG. 4 includes the following operations.

At S401, when receiving a query request of leaving a message that "那咱两一 起看电视吧 (Let's watch TV together)" to a certain telephone number, the telephone outbound call system acquires a phoneme sequence of "那咱两一 起看电视吧 (Let's watch TV together)", and determines a start phoneme and an end phoneme of a recorded statement, a start phoneme and an end phoneme of a query result statement, and an end phoneme of the statement to be synthesized from the phoneme sequence.

The telephone outbound call system determines the recorded statement of the target object as "那咱两一起 (Let's . . . together)" and the query result statement as "看电 视吧 (watch TV)" from the query request of "那咱两一 起看电视吧 (Let's watch TV together)", and determines that "那咱两一起看电视吧 (Let's watch TV together)" is in accordance with a verbal trick mode, takes "那咱两一 起看电视吧 (Let's watch TV together)" a statement to be synthesized, acquires the phoneme sequence thereof of {n, a4, ss, z, an2, i, ia3, ss, i4, q, i3, ss, k, an4, d, ian4, sh, iii4, ss, b, a5, ss, sil}, and determines a start phoneme and an phoneme of the recorded statement as 'n' and 'q' respectively, and a start phoneme and an end phoneme of the query result statement as 'k' and 'b' respectively. The end phoneme of the statement to be synthesized and the end phoneme of the query result statement are the same, and are both 'b'.

It is to be noted that 'ss' in the above phoneme is a symbol for controlling the speech rhythm of the statement to be synthesized. The symbol may be other phonemes, letters, or the like, and the phoneme sequence may include the symbol, or may not include the symbol, which is not limited in the embodiments of the present disclosure.

At S402, the telephone outbound call system performs encoding processing on the symbol sequence to obtain a feature vector set.

The telephone outbound call system obtains the feature vector corresponding to each phoneme in the phoneme sequence. The feature vectors of all phonemes form the feature vector set.

At S403, the telephone outbound call system acquires an all-zero vector as the initial acoustic feature, and acquires a recording Mel spectrum of "那咱两一起 (Let's . . . together)" from a preset recorded statement library.

At S404, the telephone outbound call system predicts the predicted acoustic feature corresponding to "那咱两一 起看电视吧 (Let's watch TV together)" based on the all-zero vector, the preset decoding model, the feature vector set, the preset attention model and the recording acoustic feature.

Figure 5:
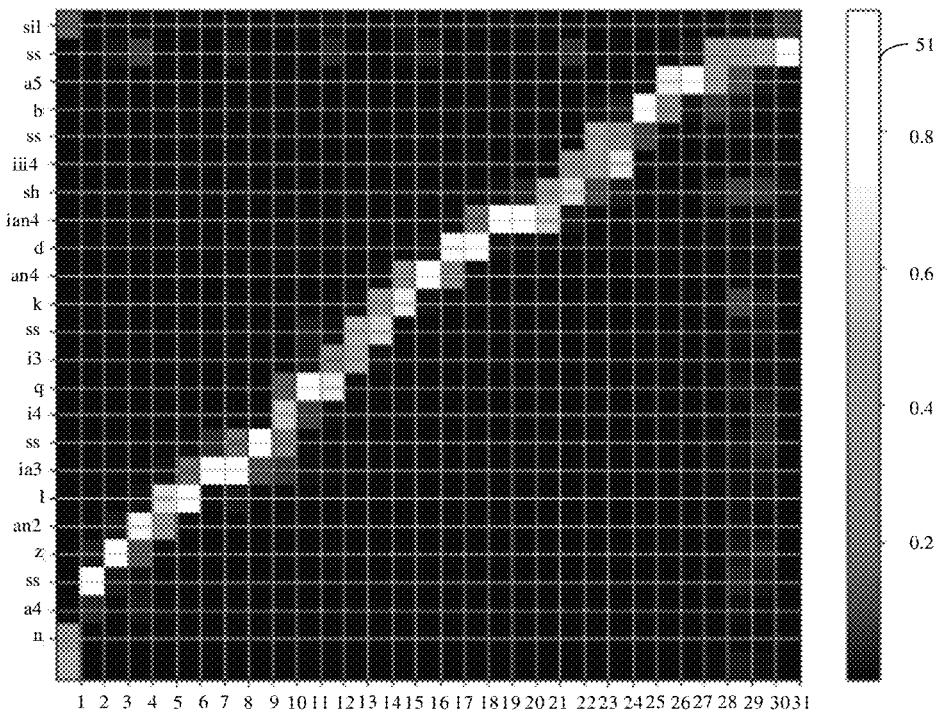
FIG. 5 is a schematic diagram of a corresponding relationship between a phoneme sequence and an attention value provided by the embodiments of the present disclosure.
Figure 6:
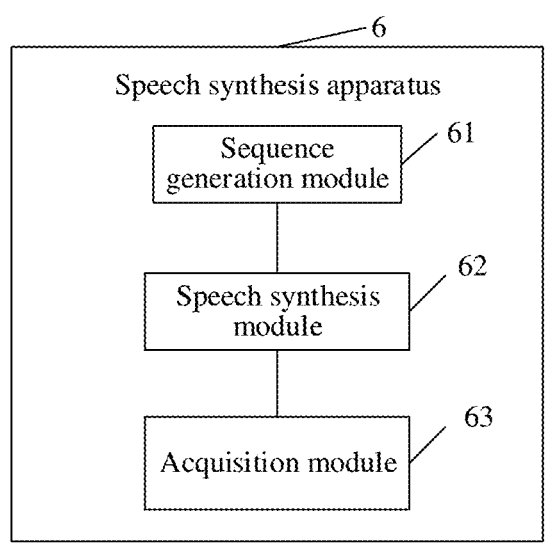
FIG. 6 is a second structural schematic diagram of a speech synthesis apparatus provided by the embodiments of the present disclosure.

Illustratively, FIG. 5 shows a schematic diagram of a corresponding relationship between a phoneme sequence and an attention value. In FIG. 5, vertical coordinates are phoneme sequences of "那咱两一 起看电视吧 (Let's watch TV together)", and horizontal coordinates are decoding times. Sign 51 on a right side indicates a corresponding relationship between attention values and colors, and the lighter the color, the greater the attention value. 0.2, 0.4, 0.6, and 0.8 in sign 51 are attention values, and it can be seen from FIG. 5 that the twelfth target phoneme with the maximum attention value is determined as 'q' from the twelfth group of attention values obtained at the twelfth decoding time, that is, the end phoneme of the recorded statement indicates that a thirteenth decoding time is a decoding time of the query result statement.

At S405, the telephone outbound call system performs feature conversion and synthesis on the predicted acoustic features to obtain a speech corresponding to "那咱两 一起看电视吧 (Let's watch TV together)".

At S406, the telephone outbound call system dials a telephone number and plays the speech to the user after the user is connected.

It can be understood that the speech synthesis method predicts to obtain the predicted acoustic feature corresponding to the statement to be synthesized based on the preset decoding model, the feature vector set, the preset attention model, and the recording acoustic feature. Since the statement to be synthesized includes the recorded statement and the query result statement, that is to say, the corresponding predicted acoustic features are obtained by predicting for the recorded statement and the query result statement, and the predicted acoustic features consist of associated a plurality of acoustic features, the problems that the speech speed, the tone, and the like of the recording and the synthesized speech are different are solved, thus, the speech rhythm obtained by the predicted acoustic feature is consistent. Secondarily, feature conversion and synthesis are performed on the predicted acoustic feature corresponding to the statement to be synthesized, which avoids the problem of uncertainty in the excessive duration during recording splicing and speech synthesizing, and improves the quality of the synthesized speech.

Second Embodiment

Further description is performed based on the same inventive conception of embodiment 1 of the present disclosure.

The embodiments of the present disclosure provide a speech synthesis apparatus 6. The apparatus 6 includes: a sequence generation module 61, a speech synthesis module 62, and an acquisition module 63.

The sequence generation module 61 is configured to acquire a symbol sequence of a statement to be synthesized. The statement to be synthesized includes a recorded statement that represents a target object and a query result statement for the target object.

The speech synthesis module 62 is configured to perform encoding processing on the symbol sequence to obtain a feature vector set by using the preset encoding model.

The acquisition module 63 is configured to acquire a recording acoustic feature corresponding to the recorded statement.

The speech synthesis module 62 is further configured to: perform prediction on the acoustic feature corresponding to the statement to be synthesized based on the preset decoding model, the feature vector set, the preset attention model, and the recording acoustic feature to obtain predicted acoustic features corresponding to the statement to be synthesized, the preset attention model being a model for generating a context vector for decoding by using the feature vector set, and the predicted acoustic feature consisting of at least one related acoustic feature; and perform feature conversion and synthesis on the predicted acoustic feature to obtain the speech corresponding to the statement to be synthesized.

In some embodiments, the speech synthesis module 62 is configured to perform the following operations. When i is equal to 1, an initial acoustic feature is acquired at an ith decoding time, and a 1st acoustic feature is predicted based on the initial acoustic feature, the preset decoding model, the feature vector set, and the preset attention model, and i is an integer greater than 0.

In a case where i is greater than 1, when the ith decoding time is a decoding time of the recorded statement, a jth frame of acoustic feature is extracted from the recording acoustic feature. The jth frame of acoustic feature is taken as an (i−1)th frame of acoustic feature. The ith acoustic feature is predicted based on the (i−1)th frame of acoustic feature, the preset decoding model, the feature vector set, and the preset attention model, and j is an integer greater than 0.

When the ith decoding time is a decoding time of a query result statement, one frame of acoustic feature of the (i−1)th acoustic feature is taken as the (i−1)th frame of acoustic feature. The ith acoustic feature is predicted based on the (i−1)th frame of acoustic feature, the preset decoding model, the feature vector set, and the preset attention model.

A prediction process of the (i+1)th decoding time is continued to be executed until the decoding of the statement to be synthesized is ended to obtain an nth acoustic feature. Herein, n is the total number of frames of the decoding times of the statement to be synthesized, and is an integer greater than 1.

The obtained ith acoustic feature to the nth acoustic feature are taken as the predicted acoustic features.

In some embodiments, the preset decoding model includes a first RNN and a second RNN.

The speech synthesis module 62 is configured to: perform non-linear transformation on the (i−1)th frame of acoustic feature to obtain an intermediate feature vector; perform matrix operation and non-linear transformation on the intermediate feature vector to obtain an ith intermediate hidden variable by using the first recurrent neural network; perform context vector calculation on the feature vector set and the ith intermediate hidden variable to obtain an ith context vector by using the preset attention model; perform matrix operation and non-linear transformation on the ith context vector and the ith intermediate hidden variable to obtain an ith hidden variable by using the second recurrent neural network; and perform linear transformation on the ith hidden variable to obtain an ith acoustic feature according to a preset number of frames.

In some embodiments, the feature vector set includes a feature vector corresponding to each symbol in the symbol sequence.

The speech synthesis module 62 is configured to perform attention calculation on the feature vector corresponding to each symbol in the symbol sequence and the ith intermediate hidden variable to obtain an ith group of attention values by using preset attention model; and perform weighted summation on feature vector set to obtain the ith context vector according to the ith group of attention values.

In some embodiments, the speech synthesis module 62 is further configured to perform the following operations. After the ith acoustic feature is predicted on the basis (i−1)th frame of acoustic feature, the preset decoding model, the feature vector set, the preset attention model, and before the prediction process of the (i+1)th decoding time is continued to be executed until the decoding of the statement to be synthesized is ended, an ith target symbol corresponding to a maximum attention value is determined from ith group of attention values.

When the ith target symbol is a non-terminal symbol of the recorded statement, an (i+1)th decoding time is determined as a decoding time of the recorded statement.

Additionally or alternatively, when the ith target symbol is a non-terminal symbol of the query result statement, the (i+1)th decoding time is determined as a decoding time of the query result statement.

Additionally or alternatively, when the ith target symbol is a non-terminal symbol of the recorded statement, and a terminal symbol of the recorded statement is not terminal symbol of the statement to be synthesized, the (i+1)th decoding time is determined as a decoding time of query result statement.

Additionally or alternatively, when the ith target symbol is a terminal symbol of the query result statement, and the terminal symbol of the query result statement is not terminal symbol of the statement to be synthesized, the (i+1)th decoding time is determined as a decoding time of the recorded statement.

Additionally or alternatively, when the ith target symbol is a terminal symbol of the statement to be synthesized, the (i+1)th decoding time is determined as a decoding time of the statement to be synthesized.

In some embodiments, the speech synthesis module 62 is configured to perform vector conversion on the symbol sequence to obtain an initial feature vector set, and perform non-linear transformation and feature extraction on the initial feature vector set to obtain a feature vector set.

In some embodiments, the speech synthesis module 62 is configured to perform feature conversion on the predicted acoustic features to obtain a linear spectrum, and perform reconstruction and synthesis on the linear spectrum to obtain a speech.

In some embodiments, the symbol sequence is a letter sequence or a phoneme sequence.

In some embodiments, the apparatus 6 may further include a training module 60.

The training module is configured to: acquire a sample symbol sequence corresponding to each of at least one sample synthesis statement before acquiring the symbol sequence of the statement to be synthesized, herein, each sample synthesis statement represents a sample object and a reference query result for the sample object; acquire an initial speech synthesis model, an initial acoustic feature, and the sample acoustic feature corresponding to the sample synthesis statement, herein, the initial speech synthesis model is a model configured for encoding processing and prediction; and train the initial speech synthesis model by using the sample symbol sequence, the initial acoustic feature, and the sample acoustic feature to obtain the preset encoding model, the preset decoding model, and the preset attention model.

It is to be noted that, in practical application, the above training module 60, the above sequence generation module 61, the above speech synthesis module 62, and the above acquisition module 63 may also be implemented by a processor 4, specifically, a Central Processing Unit (CPU), a microprocessor unit, a Digital Signal Processing (DSP), or a Field Programmable Gate Array (FPGA), located on a speech synthesis apparatus 7.

Figure 7:
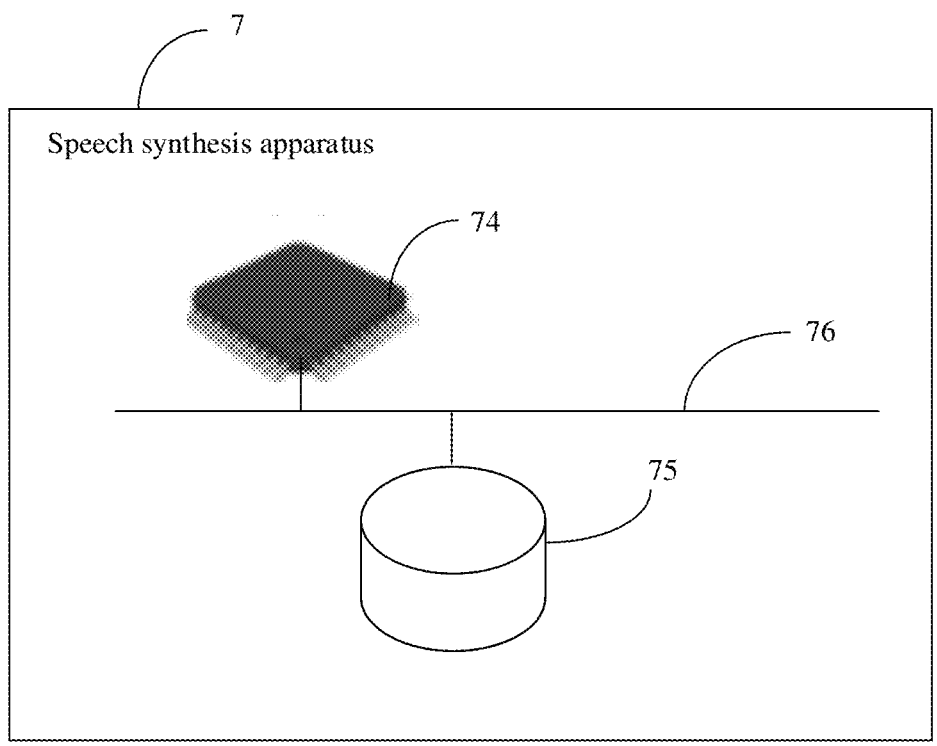
FIG. 7 is a third structural schematic diagram of a speech synthesis apparatus provided by the embodiments of the present disclosure.

The embodiments of the present disclosure further provide a speech synthesis apparatus 7. As shown in FIG. 7, the apparatus 7 includes: a processor 74, a memory 75, and a communication bus 76. The memory 75 communicates with the processor 74 through the communication bus 76. The memory 75 stores one or more speech synthesis programs executable by the processor 74. When one or more speech synthesis programs are executed, any speech synthesis method described in the foregoing embodiments is executed by the processor 74.

In practical application, the memory 75 may be a volatile memory, for example, a Random-Access First Memory (RAM), or a non-volatile memory, for example, a Read-Only Memory (ROM), a flash memory, a Hard Disc Driver (HDD), or a Solid-State Drive (SSD), or a combination of the above-mentioned types of memories, and provides a program and data for the processor 74.

The embodiments of the present disclosure provide a computer-readable storage medium, in which a speech synthesis computer program is stored. When the speech synthesis program is executed by the processor 74, the processor 74 executes any speech synthesis method in the abovementioned embodiments.

Those skilled in the art should understand that the embodiments of the present disclosure can be provided as methods, systems, or computer program products. Therefore, the present disclosure may use a form of hardware embodiments, software embodiments, or embodiments combining software and hardware. Moreover, the present disclosure may adopt the form of a computer program product implemented on one or more computer available storage media (including, but not limited to, a disk memory, a CD-ROM, an optical memory and the like) containing computer available program codes.

The present disclosure is described with reference to the flowcharts and/or block diagrams of the methods, the devices (systems), and the computer program products according to the embodiments of the present disclosure. It is to be understood that each flow and/or block in the flowcharts and/or the block diagrams and a combination of the flows and/or the blocks in the flowcharts and/or the block diagrams may be implemented by computer program instructions. These computer program instructions may be provided to a general-purpose computer, a special-purpose computer, an embedded processor of another programmable speech synthesis devices to generate a machine, so that instructions executed by the computer or the processors of the another programmable speech synthesis devices produce an apparatus for implementing functions specified in one or more flows in the flowcharts and/or one or more blocks in the block diagrams.

These computer program instructions can also be stored in a computer readable memory capable of guiding a computer or another programmable speech synthesis device to work in a specific way, so that instructions stored in the computer readable memory produce a product including an instruction apparatus that implements functions specified in one or more flows in the flowcharts and/or one or more blocks in the block diagrams.

These computer program instructions can also be loaded to a computer or another programmable speech synthesis device, so that a series of operating steps are performed on the computer or the another programmable data processing device to produce a computer-implemented process, and therefore instructions executed on the computer or the another programmable data processing device provide steps for implementing functions specified in one or more flows in the flowcharts and/or one or more blocks in the block diagrams.

The methods disclosed in some method embodiments provided in the present application may be freely combined without conflicts to obtain new method embodiments.

The characteristics disclosed in several product embodiments provided in the present disclosure may be freely combined without conflicts to obtain new product embodiments.

The characteristics disclosed in several method or device embodiments provided in the present disclosure may be freely combined without conflicts to obtain new method embodiments or device embodiments.

The above is only the preferred embodiment of the disclosure and is not intended to limit the scope of the disclosure.

INDUSTRIAL APPLICABILITY

The embodiments of the present disclosure provide a speech synthesis method and apparatus, and a storage medium. The predicted acoustic feature corresponding to the statement to be synthesized is predicted based on the preset decoding model, the feature vector set, the preset attention model, and the recording acoustic feature. Since the statement to be synthesized includes the recorded statement and the query result statement, that is to say, the predicted acoustic features corresponding to the recorded statement and the query result statement are predicted, and the predicted acoustic features consist of associated a plurality of acoustic features, the problems that the speech speed, the tone, and the like of the recording and the synthesized speech are different are solved, thus, the speech rhythm obtained by the predicted acoustic feature is consistent.

Secondarily, feature conversion and synthesis are performed on the predicted acoustic feature corresponding to the statement to be synthesized, which avoids the problem of uncertainty in the excessive duration during recording splicing and speech synthesizing, and improves the quality of the synthesized speech.

The invention claimed is:

1. A speech synthesis method performed by a speech synthesis apparatus, comprising:
　acquiring a symbol sequence of a statement to be synthesized, wherein the statement to be synthesized includes a recorded statement that represents a target object and a query result statement for the target object;
　performing encoding processing on the symbol sequence to obtain a feature vector set by using a preset encoding model;
　acquiring a recording acoustic feature corresponding to the recorded statement;
　performing prediction on an acoustic feature corresponding to the statement to be synthesized based on a preset decoding model, the feature vector set, a preset attention model, and the recording acoustic feature to obtain predicted acoustic features corresponding to the statement to be synthesized, wherein the preset attention model is a model for generating a context vector for decoding by using the feature vector set, and the predicted acoustic features consist of at least one related acoustic feature;
　performing feature conversion and synthesis on the predicted acoustic features to obtain speech corresponding to the statement to be synthesized;
　wherein the performing prediction on the acoustic feature corresponding to the statement to be synthesized based on the preset decoding model, the feature vector set, the preset attention model, and the recording acoustic feature to obtain the predicted acoustic features corresponding to the statement to be synthesized comprises:
　　when i is equal to 1, acquiring an initial acoustic feature at an ith decoding time, predicting a 1st acoustic feature corresponding to the statement to be synthesized based on the initial acoustic feature, the preset decoding model, the feature vector set, and the preset attention model, where the i is an integer greater than 0;
　　in a case where the i is greater than 1, when the ith decoding time is a decoding time of the recorded statement, acquiring a jth frame of recording acoustic feature from the recording acoustic feature, taking the jth frame of recording acoustic feature from the recording acoustic feature as an (i−1)th frame of acoustic feature corresponding to the statement to be synthesized, and predicting an ith acoustic feature corresponding to the statement to be synthesized based on the (i−1)th frame of acoustic feature corresponding to the statement to be synthesized, the preset decoding model, the feature vector set, and the preset attention model, where the i is the integer greater than 0;
　　when the ith decoding time is a decoding time of the query result statement, taking one frame of acoustic feature of an (i−1)th acoustic feature corresponding to the statement to be synthesized as the (i−1)th frame of acoustic feature corresponding to the statement to be synthesized, and predicting the ith acoustic feature corresponding to the statement to be synthesized based on the (i−1)th frame of acoustic feature corresponding to the statement to be synthesized, the preset decoding model, the feature vector set, and the preset attention model;
　　continuing to perform a prediction process of an (i+1)th decoding time until a decoding of the statement to be synthesized is ended to obtain an nth acoustic feature corresponding to the statement to be synthesized, wherein n is a total number of frames of decoding times of the statement to be synthesized and is an integer greater than 1; and
　　taking the ith acoustic feature to the nth acoustic feature corresponding to the statement to be synthesized as the predicted acoustic features; and
　transmitting the speech to a playback module and playing the speech by the playback module.

2. The method of claim 1, wherein the preset decoding model comprises a first Recurrent Neural Network (RNN) and a second RNN; and the predicting the ith acoustic feature corresponding to the statement to be synthesized based on the (i−1)th frame of acoustic feature corresponding to the statement to be synthesized, the preset decoding model, the feature vector set, and the preset attention model comprises:
　performing a first non-linear transformation on the (i−1)th frame of acoustic feature corresponding to the statement to be synthesized to obtain an intermediate feature vector;
　performing a first matrix operation and a second non-linear transformation on the intermediate feature vector to obtain an ith intermediate hidden variable by using the first RNN;
　performing a context vector calculation on the feature vector set and the ith intermediate hidden variable to obtain an ith context vector by using the preset attention model;
　performing a second matrix operation and a third non-linear transformation on the ith context vector and the ith intermediate hidden variable to obtain an ith hidden variable by using the second RNN; and
　performing a linear transformation on the ith hidden variable to obtain the ith acoustic feature corresponding to the statement to be synthesized according to a preset number of frames.

3. The method of claim 2, wherein the feature vector set comprises a feature vector corresponding to each symbol in the symbol sequence; the performing the context vector calculation on the feature vector set and the ith intermediate hidden variable to obtain the ith context vector by using the preset attention model comprises:
　performing the context vector calculation on the feature vector corresponding to each symbol in the symbol sequence and the ith intermediate hidden variable to obtain an ith group of attention values by using the preset attention model; and
　performing weighted summation on the feature vector set to obtain the ith context vector according to the ith group of attention values.

4. The method of claim 3, wherein after predicting the ith acoustic feature corresponding to the statement to be synthesized based on the (i−1)th frame of acoustic feature corresponding to the statement to be synthesized, the preset decoding model, the feature vector set, and the preset attention model, and before continuing to perform the prediction process of the (i+1)th decoding time, the method further comprises:
　determining an ith target symbol corresponding to a maximum attention value from the ith group of attention values; and at least one of
- when the ith target symbol is a non-terminal symbol of the recorded statement, determining the (i+1)th decoding time as the decoding time of the recorded statement;
- when the ith target symbol is a non-terminal symbol of the query result statement, determining the (i+1)th decoding time as the decoding time of the query result statement;
- when the ith target symbol is the non-terminal symbol of the recorded statement, and a terminal symbol of the recorded statement is not a terminal symbol of the statement to be synthesized, determining the (i+1)th decoding time as the decoding time of the query result statement;
- when the ith target symbol is a terminal symbol of the query result statement, and the terminal symbol of the query result statement is not the terminal symbol of the statement to be synthesized, determining the (i+1)th decoding time as the decoding time of the recorded statement; or
- when the ith target symbol is the terminal symbol of the statement to be synthesized, determining the (i+1)th decoding time as a decoding time of the statement to be synthesized.

5. The method of claim 1, wherein the performing encoding processing on the symbol sequence to obtain the feature vector set by using the preset encoding model comprises:
- performing vector conversion on the symbol sequence to obtain an initial feature vector set by using the preset encoding model; and
- performing non-linear transformation and feature extraction on the initial feature vector to obtain the feature vector set.

6. The method of claim 1, wherein the performing feature conversion and synthesis on the predicted acoustic features to obtain the speech corresponding to the statement to be synthesized comprises:
- performing the feature conversion on the predicted acoustic features to obtain a linear spectrum; and
- performing reconstruction and synthesis on the linear spectrum to obtain the speech.

7. The method according to claim 1, wherein the symbol sequence is a letter sequence or a phoneme sequence.

8. The method according to claim 1, wherein before acquiring the symbol sequence of the statement to be synthesized, the method further comprises:
- acquiring a sample symbol sequence corresponding to each of at least one sample synthesis statement, wherein each of the at least one sample synthesis statement represents a sample object and a reference query result for the sample object;
- acquiring an initial speech synthesis model, the initial acoustic feature, and a sample acoustic feature corresponding to the at least one sample synthesis statement, wherein the initial speech synthesis model is a model configured for encoding processing, and prediction; and
- training the initial speech synthesis model by using the sample symbol sequence, the initial acoustic feature, and the sample acoustic feature to obtain the preset encoding model, the preset decoding model, and the preset attention model.

9. A speech synthesis apparatus, comprising:
a memory for storing instructions executable by a processor;
the processor configured to execute the instructions to perform operations of:
- acquiring a symbol sequence of a statement to be synthesized, wherein the statement to be synthesized includes a recorded statement that represents a target object and a query result statement for the target object;
- performing encoding processing on the symbol sequence to obtain a feature vector set by using a preset encoding model;
- acquiring a recording acoustic feature corresponding to the recorded statement;
- performing prediction on an acoustic feature corresponding to the statement to be synthesized based on a preset decoding model, the feature vector set, a preset attention model, and the recording acoustic feature to obtain predicted acoustic features corresponding to the statement to be synthesized, the preset attention model being a model for generating a context vector for decoding by using the feature vector set, and the predicted acoustic features consisting of at least one related acoustic feature;
- performing feature conversion and synthesis on the predicted acoustic features to obtain speech corresponding to the statement to be synthesized;
- wherein the performing prediction on the acoustic feature corresponding to the statement to be synthesized based on the preset decoding model, the feature vector set, the preset attention model, and the recording acoustic feature to obtain the predicted acoustic features corresponding to the statement to be synthesized comprises:
  - when i is equal to 1, acquiring an initial acoustic feature at an ith decoding time, predicting a 1st acoustic feature corresponding to the statement to be synthesized based on the initial acoustic feature, the preset decoding model, the feature vector set, and the preset attention model, where the i is an integer greater than 0;
  - in a case where the i is greater than 1, when the ith decoding time is a decoding time of the recorded statement, acquiring a jth frame of recording acoustic feature from the recording acoustic feature, taking the jth frame of recording acoustic feature from the recording acoustic feature as an (i−1)th frame of acoustic feature corresponding to the statement to be synthesized, and predicting an ith acoustic feature corresponding to the statement to be synthesized based on the (i−1)th frame of acoustic feature corresponding to the statement to be synthesized, the preset decoding model, the feature vector set, and the preset attention model, where the i is the integer greater than 0;
  - when the ith decoding time is a decoding time of the query result statement, taking one frame of acoustic feature of an (i−1)th acoustic feature corresponding to the statement to be synthesized as the (i−1)th frame of acoustic feature corresponding to the statement to be synthesized, and predicting the ith acoustic feature corresponding to the statement to be synthesized based on the (i−1)th frame of acoustic feature corresponding to the statement to be synthesized, the preset decoding model, the feature vector set, and the preset attention model;
  - continuing to perform a prediction process of an (i+1)th decoding time until a decoding of the statement to be synthesized is ended to obtain an nth acoustic feature corresponding to the statement to be synthesized, wherein n is a total number of frames of decoding times of the statement to be synthesized, and is an integer greater than 1; and taking the ith acoustic feature to the nth acoustic feature corresponding to the statement to be synthesized as the predicted acoustic features; and transmitting the speech to a playback module and playing the speech by the playback module.

10. The apparatus of claim 9, wherein the preset decoding model comprises a first Recurrent Neural Network (RNN) and a second RNN; and the predicting the ith acoustic feature corresponding to the statement to be synthesized based on the (i−1)th frame of acoustic feature corresponding to the statement to be synthesized, the preset decoding model, the feature vector set, and the preset attention model comprises:

performing a first non-linear transformation on the (i−1)th frame of acoustic feature corresponding to the statement to be synthesized to obtain an intermediate feature vector;

performing a first matrix operation and a second non-linear transformation on the intermediate feature vector to obtain an ith intermediate hidden variable by using the first RNN;

performing a context vector calculation on the feature vector set and the ith intermediate hidden variable to obtain an ith context vector by using the preset attention model;

performing a second matrix operation and a third non-linear transformation on the ith context vector and the ith intermediate hidden variable to obtain an ith hidden variable by using the second RNN; and performing a linear transformation on the ith hidden variable to obtain the ith acoustic feature corresponding to the statement to be synthesized according to a preset number of frames.

11. The apparatus of claim 10, wherein the feature vector set comprises a feature vector corresponding to each symbol in the symbol sequence; the performing the context vector calculation on the feature vector set and the ith intermediate hidden variable to obtain the ith context vector by using the preset attention model comprises:

performing the context vector calculation on the feature vector corresponding to each symbol in the symbol sequence and the ith intermediate hidden variable to obtain an ith group of attention values by using the preset attention model; and performing weighted summation on the feature vector set to obtain the ith context vector according to the ith group of attention values.

12. The apparatus of claim 11, wherein the processor is further configured to execute the instructions to perform the operations of:

after predicting the ith acoustic feature corresponding to the statement to be synthesized based on the (i−1)th frame of acoustic feature corresponding to the statement to be synthesized, the preset decoding model, the feature vector set, and the preset attention model, and before continuing to perform the prediction process of the (i+1)th decoding time, determining an ith target symbol corresponding to a maximum attention value from the ith group of attention values; and at least one of:

when the ith target symbol is a non-terminal symbol of the recorded statement, determining the (i+1)th decoding time as the decoding time of the recorded statement;

when the ith target symbol is a non-terminal symbol of the query result statement, determining the (i+1)th decoding time as the decoding time of the query result statement;

when the ith target symbol is the non-terminal symbol of the recorded statement, and a terminal symbol of the recorded statement is not a terminal symbol of the statement to be synthesized, determining the (i+1)th decoding time as the decoding time of the query result statement;

when the ith target symbol is a terminal symbol of the query result statement, and the terminal symbol of the query result statement is not the terminal symbol of the statement to be synthesized, determining the (i+1)th decoding time as the decoding time of the recorded statement; or when the ith target symbol is the terminal symbol of the statement to be synthesized, determining the (i+1)th decoding time as a decoding time of the statement to be synthesized.

13. The apparatus of claim 9, wherein the performing encoding processing on the symbol sequence to obtain the feature vector set by using the preset encoding model comprises:

performing vector conversion on the symbol sequence to obtain an initial feature vector set by using the preset encoding model; and performing non-linear transformation and feature extraction on the initial feature vector to obtain the feature vector set.

14. The apparatus of claim 9, wherein the performing feature conversion and synthesis on the predicted acoustic features to obtain the speech corresponding to the statement to be synthesized comprises:

performing the feature conversion on the predicted acoustic features to obtain a linear spectrum; and performing reconstruction and synthesis on the linear spectrum to obtain the speech.

15. The apparatus according to claim 9, wherein the symbol sequence is a letter sequence or a phoneme sequence.

16. The apparatus according to claim 9, wherein before acquiring the symbol sequence of the statement to be synthesized, the operations further comprise:

acquiring a sample symbol sequence corresponding to each of at least one sample synthesis statement, wherein each of the at least one sample synthesis statement represents a sample object and a reference query result for the sample object;

acquiring an initial speech synthesis model, the initial acoustic feature, and a sample acoustic feature corresponding to the at least one sample synthesis statement, wherein the initial speech synthesis model is a model configured for encoding processing, and prediction; and training the initial speech synthesis model by using the sample symbol sequence, the initial acoustic feature, and the sample acoustic feature to obtain the preset encoding model, the preset decoding model, and the preset attention model.

17. A non-transitory computer-readable storage medium, which is located in a speech synthesis apparatus and has stored a program that when executed by at least one processor in the speech synthesis apparatus, causes the at least one processor to execute a speech synthesis method, the speech synthesis method comprising:

acquiring a symbol sequence of a statement to be synthesized, wherein the statement to be synthesized includes a recorded statement that represents a target object and a query result statement for the target object;

performing encoding processing on the symbol sequence to obtain a feature vector set by using a preset encoding model;

acquiring a recording acoustic feature corresponding to the recorded statement;

performing prediction on an acoustic feature corresponding to the statement to be synthesized based on a preset decoding model, the feature vector set, a preset attention model, and the recording acoustic feature to obtain predicted acoustic features corresponding to the statement to be synthesized, wherein the preset attention model is a model for generating a context vector for decoding by using the feature vector set, and the predicted acoustic features consist of at least one related acoustic feature;

performing feature conversion and synthesis on the predicted acoustic features to obtain speech corresponding to the statement to be synthesized;

wherein the performing prediction on the acoustic feature corresponding to the statement to be synthesized based on the preset decoding model, the feature vector set, the preset attention model, and the recording acoustic feature to obtain the predicted acoustic features corresponding to the statement to be synthesized comprises:

when i is equal to 1, acquiring an initial acoustic feature at an ith decoding time, predicting a 1st acoustic feature corresponding to the statement to be synthesized based on the initial acoustic feature, the preset decoding model, the feature vector set, and the preset attention model, where the i is an integer greater than 0;

in a case where the i is greater than 1, when the ith decoding time is a decoding time of the recorded statement, acquiring a jth frame of recording acoustic feature from the recording acoustic feature, taking the jth frame of recording acoustic feature from the recording acoustic feature as an (i−1)th frame of acoustic feature corresponding to the statement to be synthesized, and predicting an ith acoustic feature corresponding to the statement to be synthesized based on the (i−1)th frame of acoustic feature corresponding to the statement to be synthesized, the preset decoding model, the feature vector set, and the preset attention model, where the i is the integer greater than 0;

when the ith decoding time is a decoding time of the query result statement, taking one frame of acoustic feature of an (i−1)th acoustic feature corresponding to the statement to be synthesized as the (i−1)th frame of acoustic feature corresponding to the statement to be synthesized, and predicting the ith acoustic feature corresponding to the statement to be synthesized based on the (i−1)th frame of acoustic feature corresponding to the statement to be synthesized, the preset decoding model, the feature vector set, and the preset attention model;

continuing to perform a prediction process of an (i+1)th decoding time until a decoding of the statement to be synthesized is ended to obtain an nth acoustic feature corresponding to the statement to be synthesized, wherein n is a total number of frames of decoding times of the statement to be synthesized, and is an integer greater than 1; and taking the ith acoustic feature to the nth acoustic feature corresponding to the statement to be synthesized as the predicted acoustic features; and transmitting the speech to a playback module and playing the speech by the playback module.

* * * * *